United States Patent
Phifer et al.

(10) Patent No.: US 6,254,785 B1
(45) Date of Patent: Jul. 3, 2001

(54) APPARATUS AND PROCESS FOR WATER TREATMENT

(75) Inventors: Mark A. Phifer; Ralph L. Nichols, both of North Augusta, SC (US)

(73) Assignee: Westinghouse Savannah River Company, Aiken, SC (US)

(*) Notice: Subject to any disclaimer, the term of this patent is extended or adjusted under 35 U.S.C. 154(b) by 0 days.

(21) Appl. No.: 09/051,076

(22) PCT Filed: Dec. 19, 1997

(86) PCT No.: PCT/US97/23935

§ 371 Date: Apr. 1, 1998

§ 102(e) Date: Apr. 1, 1998

(87) PCT Pub. No.: WO99/32408

PCT Pub. Date: Jul. 1, 1999

(51) Int. Cl.[7] .............................. B01D 1/00; B01D 15/00
(52) U.S. Cl. ............................................. 210/747; 210/667
(58) Field of Search ................................... 210/600, 660, 210/691, 747, 170, 263, 287–289, 291; 405/36

(56) References Cited

U.S. PATENT DOCUMENTS

| | | | |
|---|---|---|---|
| 4,473,477 | * 9/1984 | Beall | 210/747 |
| 4,664,809 | * 5/1987 | Fenton et al. | 210/660 |
| 4,919,568 | * 4/1990 | Hurley | 210/747 |
| 5,318,698 | * 6/1994 | Bernhardt | 210/170 |
| 5,468,097 | * 11/1995 | Bernhardt | 405/52 |
| 5,514,279 | * 5/1996 | Blowes et al. | 210/747 |
| 5,534,154 | * 7/1996 | Gillham | 210/747 |
| 5,547,589 | * 8/1996 | Carroll, II | 210/747 |

OTHER PUBLICATIONS

International Search Report for PCT/US97/23935, Apr. 3, 1998.*

* cited by examiner

Primary Examiner—Duane Smith
Assistant Examiner—Frank M. Lawrence
(74) Attorney, Agent, or Firm—Oscar A. Towler, III; Hardaway/Mann IP Group

(57) ABSTRACT

An apparatus is disclosed utilizing permeable treatment media for treatment of contaminated water, along with a method for enhanced passive flow of contaminated water through the treatment media. The apparatus includes a treatment cell including a permeable structure that encloses the treatment media, the treatment cell may be located inside a water collection well, exterior to a water collection well, or placed in situ within the pathway of contaminated groundwater. The passive flow of contaminated water through the treatment media is maintained by a hydraulic connection between a collecting point of greater water pressure head, and a discharge point of lower water pressure head. The apparatus and process for passive flow and groundwater treatment utilizes a permeable treatment media made up of granular metal, bimetallics, granular cast iron, activated carbon, cation exchange resins, and/or additional treatment materials. An enclosing container may have an outer permeable wall for passive flow of water into the container and through the enclosed treatment media to an effluent point. Flow of contaminated water is attained without active pumping of water through the treatment media. Remediation of chlorinated hydrocarbons and other water contaminants to acceptable regulatory concentration levels is accomplished without the costs of pumping, pump maintenance, and constant oversight by personnel.

9 Claims, 12 Drawing Sheets

APPARATUS AND PROCESS FOR WATER TREATMENT

DISCLOSURE

The United States Government has rights in this invention pursuant to Contract No. DE-AC09-96-SR18500 between the U.S. Department of Energy and Westinghouse Savannah River Company.

BRIEF SUMMARY OF THE INVENTION

The invention relates generally to technology for treatment of water, and more particularly to remediation of groundwater utilizing a passive, in situ, or ex situ treatment method for the remediation of contaminants in groundwater.

BACKGROUND OF INVENTION

A wide variety of technologies are utilized to remediate contaminated groundwater, including the method of pumping groundwater to the surface and treating groundwater in reactors, or bioremediation with microbial populations in situ, or ex situ, or injection of catalysts into the ground to encourage natural remediation of contaminants in groundwater.

In Horn, U.S. Pat. No. 5,635,394, a bioreactor is disclosed which serves as a biological air filter for purification of air streams. In Fernandao, et al., U.S. Pat. No. 5,616,253 and U.S. Pat. No. 5,611,936, various methods are disclosed for utilizing a palladized iron bimetallic system for the dechlorination of chlorinated organic compounds in contaminated soils and various effluents. In Howson, et al., U.S. Pat. No. 5,543,059, a method is disclosed for remediation of contaminated solutions by a tiered metal wall or column having reducing metal particles, to dehalogenate hydrocarbon contaminants. In Sivavec, U.S. Pat. No. 5,447,639, a method is disclosed for remediation of aqueous solutions of chlorinated aliphatic hydrocarbons utilizing in situ or ex situ reactions with ferrous sulfide. In Thornton, U.S. Pat. No. 5,380,441, a method is disclosed for the addition of metallic iron particles to an aqueous solution containing hexavalent chromium to precipitate and reduce the hexavalent chromium to trivalent chromium. In Gillham, U.S. Pat. No. 5,266,213, a method is disclosed for remediation of aqueous halogenated organic compounds utilizing a metal in a trench to produce reducing conditions.

The above described and other methods of remediation have shortcomings which require the installation of an in situ permanent or semi-permanent reactor apparatus to contact contaminated groundwater. A commonly used method of remediation requires that groundwater is pumped to the surface into reactors containing reacting agents for treatment. Continuous pumping of groundwater is costly and inefficient, and in situ placement of remediation mechanisms can be obstructed underground by clogging and biological fouling of filters. Thus there exists room for improvement within the art.

SUMMARY OF THE INVENTION

It is an object of this invention to provide an apparatus and process directed towards the treatment of water.

It is a further object of this invention to provide an apparatus that operates in situ and utilizes passively induced movement of groundwater through the apparatus.

It is an additional object of this invention to provide an apparatus that contains a permeable treatment media that provides for the passive remediation of contamination in groundwater.

It is a further and more particular object of this invention to provide a method for inserting and maintaining an in situ treatment media for the passive remediation of contamination in groundwater.

It is yet a further and more particular object of this invention to provide an in situ or ex situ passive system for treatment and/or filtering of groundwater, without the need for mechanical pumps.

It is yet an additional and more particular object of this invention to provide in situ treatment of groundwater within a defined area or container underground, with removal of treated water by pumping, siphoning, or passive flow.

These and other objects of the invention are accomplished by
an apparatus and a process for treating contaminated water including: providing a treatment media within a defined treatment zone; providing an enclosure for the treatment media; providing a flow of contaminated water through the permeable treatment media, by locating the treatment media between a first and a second location, the two locations being in hydraulic communication; establishing a lower pressure head at the second location; maintaining a pressure differential between the first location and second location; with the pressure differential removing treated groundwater from the permeable treatment media by siphon or natural passive flow.

Thus, the objects of the invention are accomplished by the apparatus containing permeable treatment media, and a process for treatment of contaminated water as described herein.

BRIEF DESCRIPTION OF THE DRAWINGS

Various other features and advantages will become apparent from a reading of the following detailed description, given with reference to the various figures of drawing, in which.

DETAILED DESCRIPTION OF THE PREFERRED EMBODIMENTS

In accordance with this invention, it has been found that an approved process and apparatus can be provided to decontaminate groundwater or to treat water with inadequate water quality. The invention is capable of passively moving water through a permeable treatment media, either below ground (in situ), or above ground (ex situ). The invention utilizes natural hydraulic head differences between two points to passively induce water flow at a selected location through a defined treatment zone containing permeable treatment media for improving water quality by treatment of contaminated roundwater or contaminated surface water.

Figure 1:
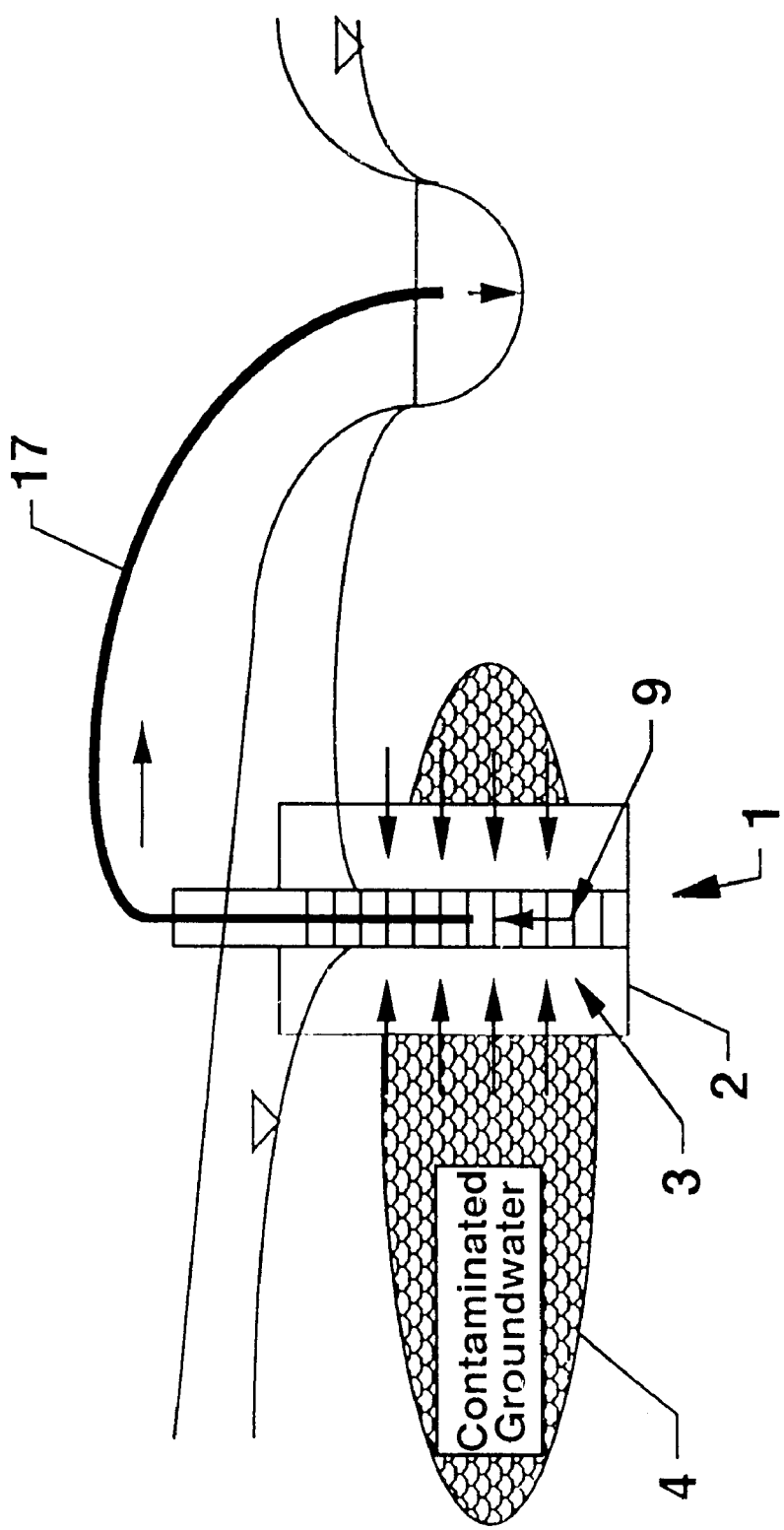
FIG. 1 is an overall schematic of one embodiment of the present invention having treatment cells below ground and surrounding a passive water collection well.
Figure 2:
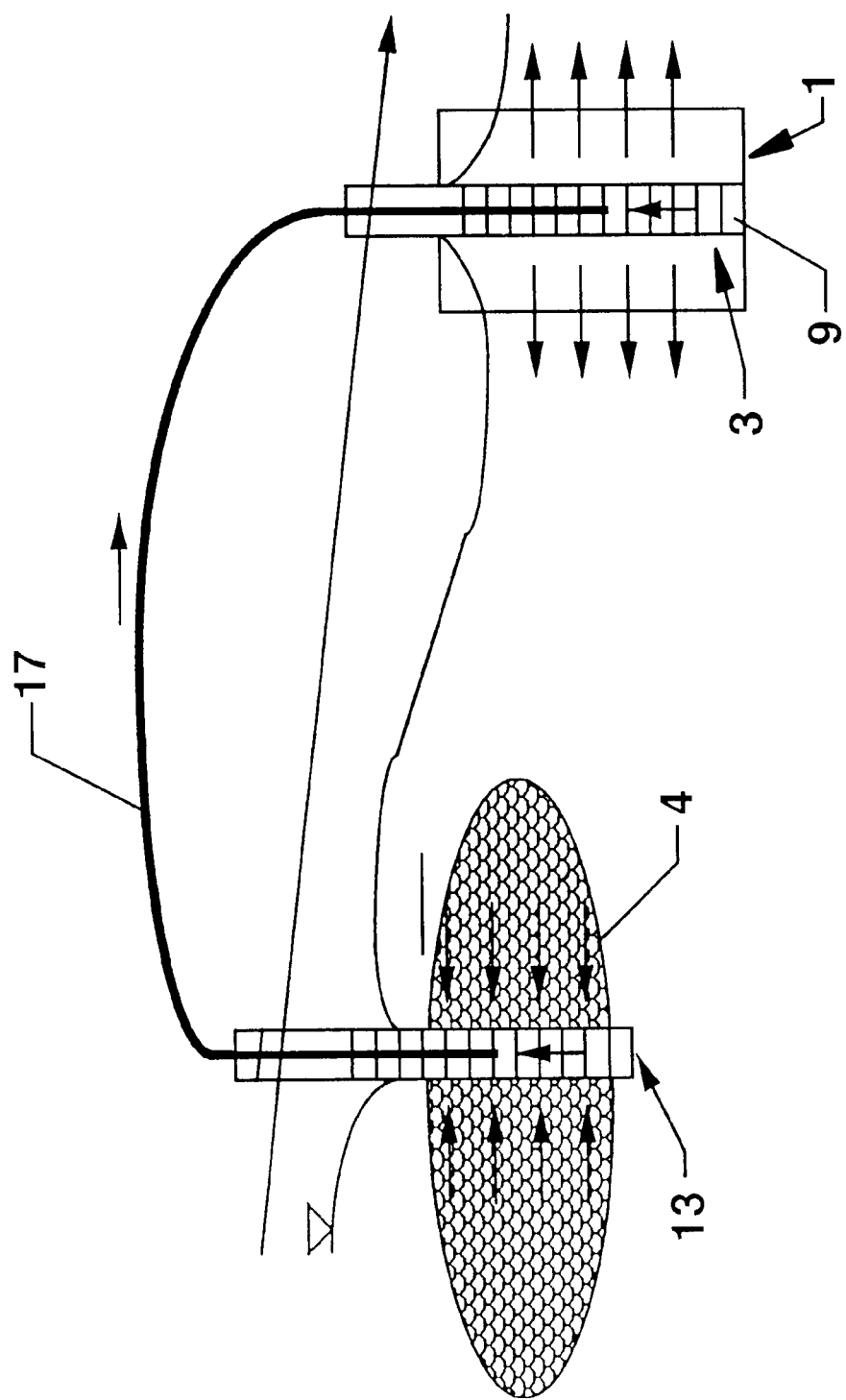
FIG. 2 is a schematic of another embodiment of the present invention having treatment cells below ground and surrounding a passive water discharge well of the present invention.

In accordance with FIGS. 1–2, the present invention is an apparatus comprising a treatment cell 1 containing a porous mixture of treatment media 3, through which water 4 flows for treatment by the treatment media 3. The effluent of cleansed water may be removed from an in situ container 2 of treatment media by siphon 17, active pumping, or passive natural flow.

Figure 3:
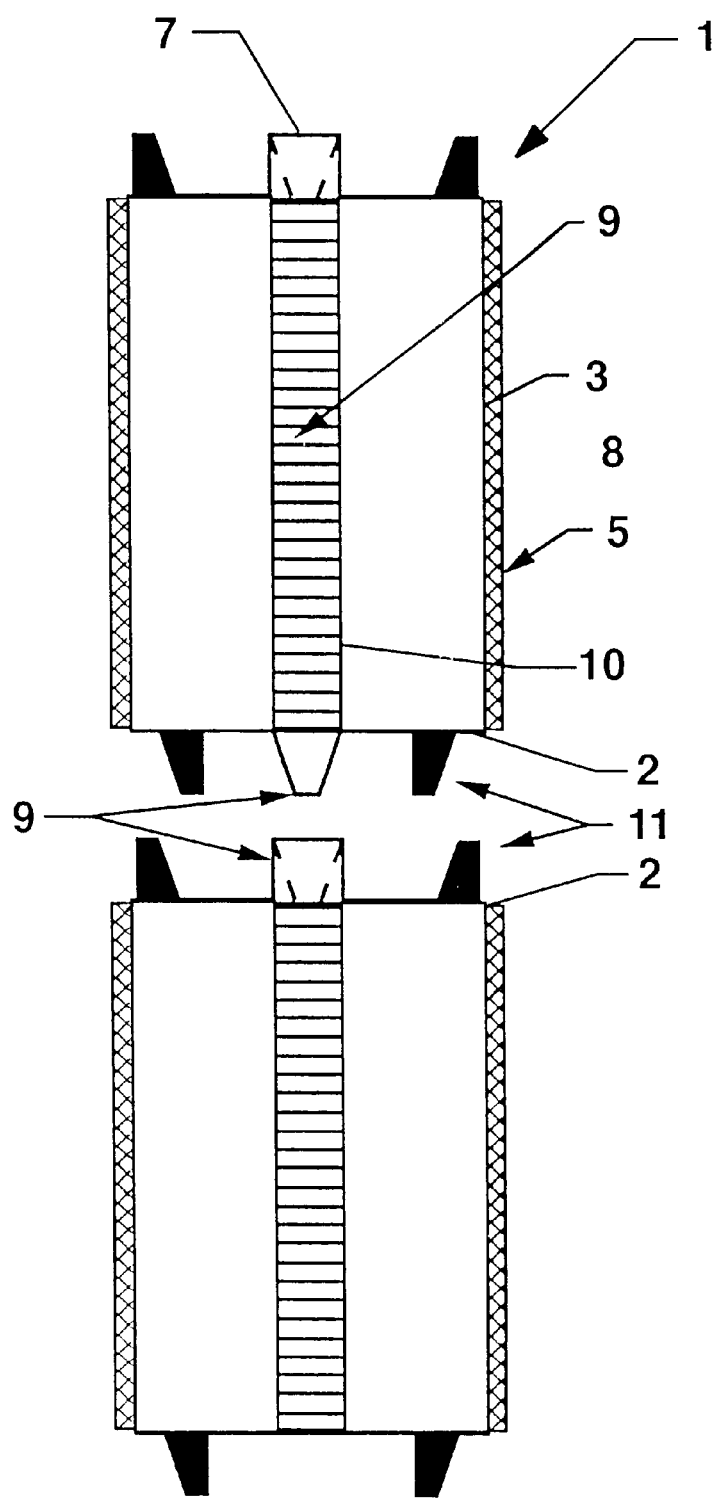
FIGS. 3–4 are cross-sectional side views of containers of treatment media in accordance with the present invention.
Figure 4:
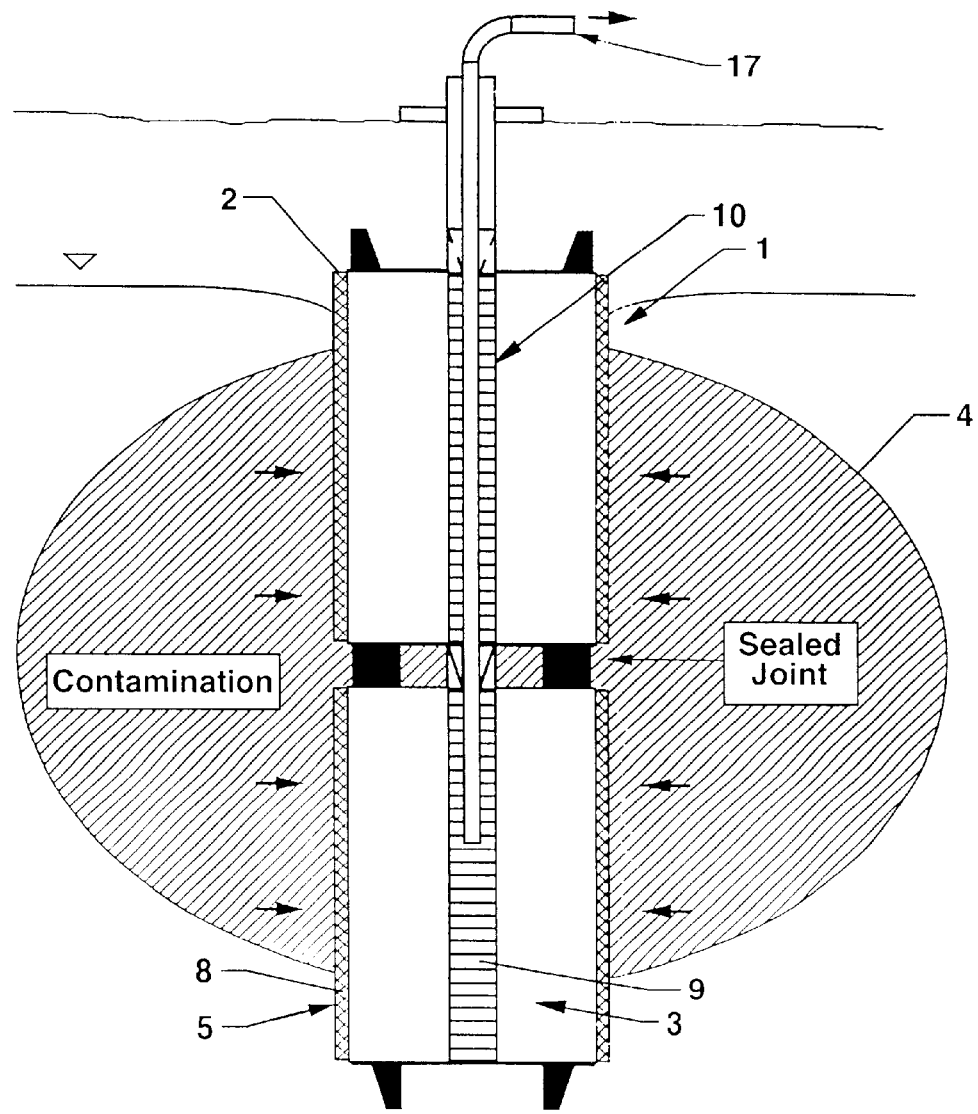

As shown in FIGS. 3–4, the treatment cell may include a container 2 with permeable intake walls 5, effluent openings 7, and a central conduit 9 surrounded by permeable treatment media 3. The central conduit 9 has walls 10 consisting of permeable screens, filters or membranes which allow water to move through the conduit walls 10 into the conduit 9 for exiting from the container at effluent openings 7. The container 2 has a stackable configuration (FIG. 4), with sealable joints 11 which interconnect with sealable joints of another container 2 to form two or more treatment cells.

Figure 6:
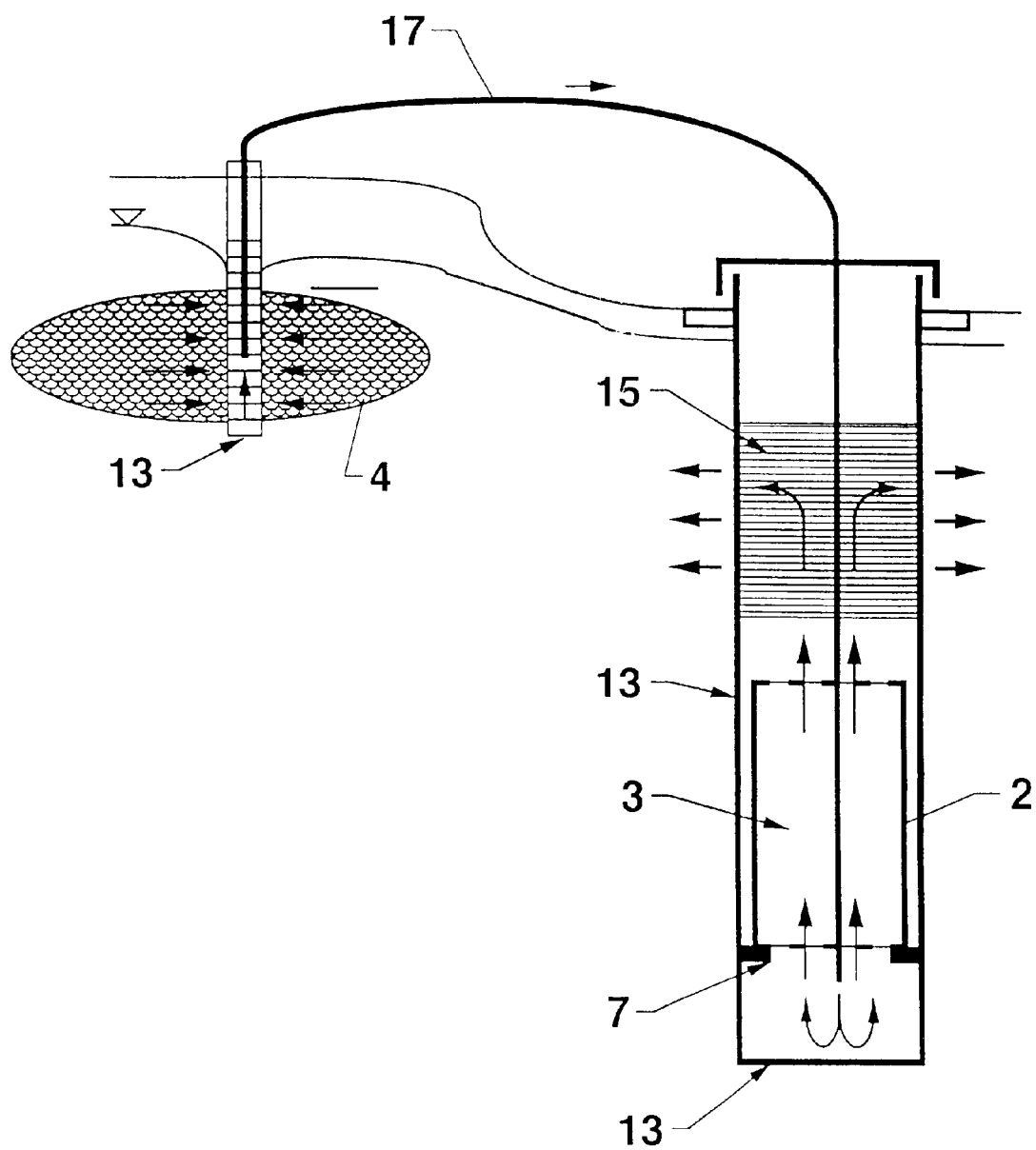
Figure 7:
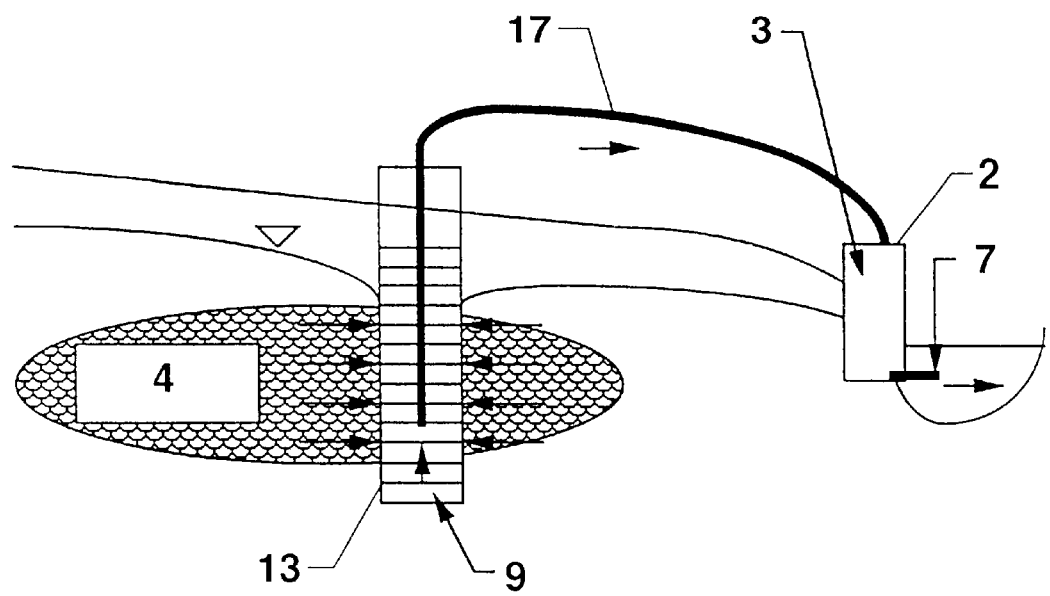

The treatment cell 1 may be placed vertically into a well casing 13 (see FIGS. 5–6), or placed in a defined zone of treatment media 3, downgradient from the groundwater collection well 13, with the treatment cell 1 connected to the collection well 13 by a siphon 17 (FIG. 7). The permeable treatment media 3 and enclosing container 2 may be positioned inside a well casing 13 (see FIGS. 5, 6, 10, and 11), or positioned around the water intake or outflow screens of the collection well (see FIGS. 1, 2, and 9), or positioned external to a groundwater intake point (see FIGS. 7, 8, and 13). For the present invention, groundwater is defined as water located below the ground surface, or water collected below the ground surface and discharged back underground or to the surface. Also for the present invention, the container may be a container separate than the groundwater well casing 13, or a borehole may serve as a containment vessel for the treatment media 3, without an enclosing container 2 or a well casing 13.

The treatment cell 1 enclosing the permeable treatment media 3 may be placed within the pathway of flow of contaminated water, but above ground and external (see FIG. 7) to a well casing 13. The passively induced treatment comprises a combination of permeable treatment media located in the pathway of water 4 to be treated, and a process to establish an enhanced passive flow of the contaminated groundwater through the treatment zone. The treatment zone may be defined by a trench of treatment media, by an augered hole of treatment media, a well structure confining the treatment media, or a container of treatment media. The treatment zone or structure is connected with passively induced flow of water to provide an efficient process to remediate contaminated groundwater or water with inadequate water quality without the need for active pumping.

The passively induced treatment system provides enhancement of the passive movement of contaminated groundwater flow through a defined treatment zone of permeable treatment media at an accelerated rate. The accelerated rate of groundwater flow is induced by utilizing the natural or man-made (i.e., dam, trench, or groundwater withdrawals) hydraulic head differences between two points. A first location would have groundwater at a higher hydraulic gradient, also termed a greater pressure head, and a second discharge location would receive water at a lower pressure head. The water collected at the first location is hydraulicly connected by siphons 17 or other conduits to the second location. The accelerated flow rate can be produced through the use of siphons 17 connecting two groundwater wells, or in situ channels of contaminated groundwater flowing due to pressure differences between two points of natural or man-made head differences. The up gradient inlet or uptake collection well is located within an aquifer containing water to be cleaned, and the down gradient discharge point may be to the subsurface by discharge in an outlet well, or to the ground surface, or to a surface water body by a siphon 17 conduit or channeled water flow. The permeable treatment media can be applied at any point in the pathway of contaminated water flow along the passively induced, variable flow pattern, and can be applied in situ (underground), or ex situ (aboveground), and can be configured to be either permanent, removable, and/or rechargeable.

The treatment cell 1 in FIGS. 3 and 4, includes permeable walls 5 of the container 2, the permeable walls 5 composed of an outer porous screen (not shown), or porous geonet 8 or geotextile material, or other porous material such as screens of metal or plastic, or permeable membrane (not shown). Other porous material for the construction of permeable walls or conduits includes: artificial gravel packs, washed rounded rock, permeable native soils, sand, or combinations of the above with layers of geotextiles or geonets. The permeable walls 5 allow free movement of water from outside the container 2 to the interior (see FIGS. 1 and 4), or from the interior to the outside of the container 2 (see FIGS. 2 and 6). The geonet 8 layer is composed of a geotextile bonded to both sides of the layer to restrict the movement of soil particles into the container, and to limit the loss of treatment media 3, such as metal filings or granular cast iron, and activated carbon, from inside the container. The geonet 8 also has a high planar transmissivity. This property allows the geonet 8, which is vertically oriented, to provide a more even distribution of head pressure and flow with depth over the length of the surface of the container or collection well. A more even distribution of head pressure and flow allows a more even flow of contaminated water through the sides of the container 2 inside a collection well casing 13, providing a more even distribution of contaminants over the surface area of the treatment media 3 within the container. The flow of water into, or out of the permeable treatment media 3, may be radially inward through the interior void area filled with porous media and a central conduit.

Figure 9:
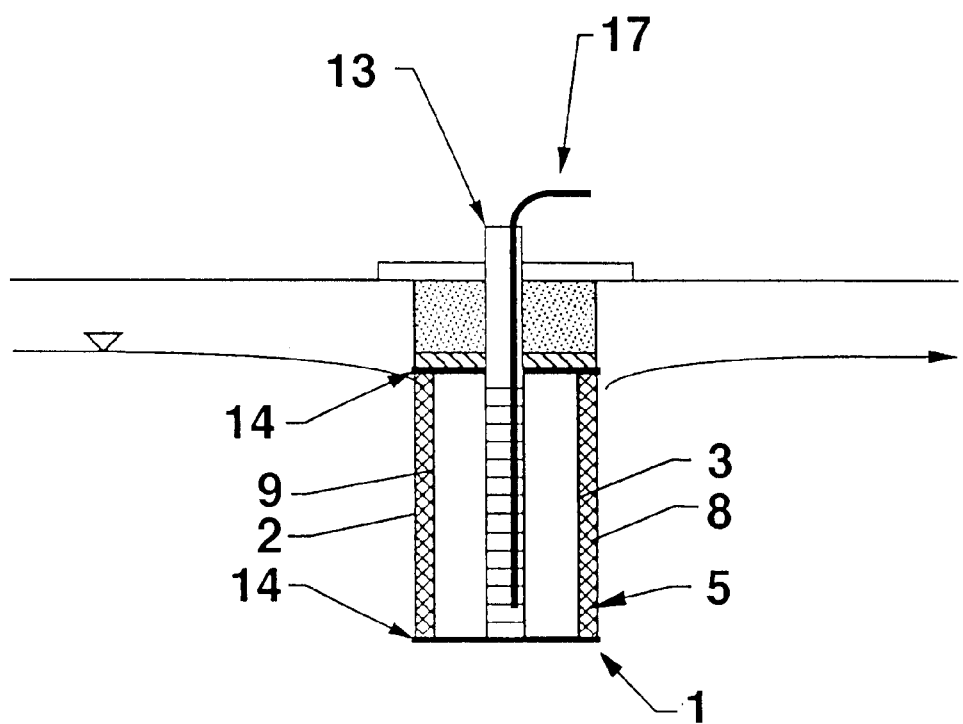
Figure 12:
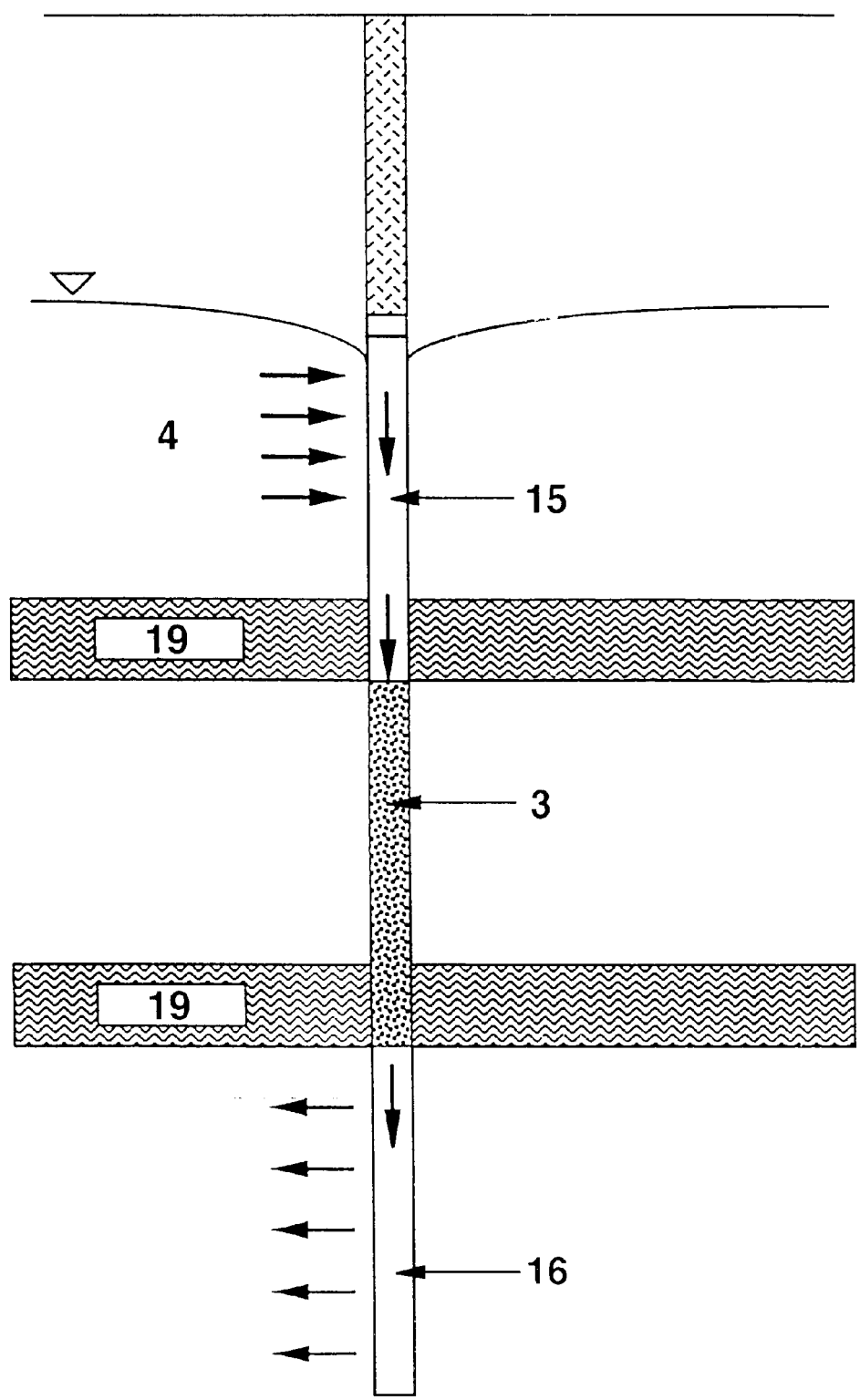

An installed example of one configuration of the treatment cell 1 utilizing a container 2 is shown in FIG. 9. The treatment cell 1 may be any diameter, ranging from less than eight inches diameter, up to more than an eight foot diameter treatment cell 1. The outer permeable walls 5 of the treatment cell 1, may be composed of an outer porous screen (not shown), a porous geonet 8 of geotextile material, a permeable fibrous material (not shown), or other porous material such as screens, gravel packs, or similar permeable structures (not shown). The walls 5 serve as filters of groundwater passing through the treatment cell 1 to reduce sediment moving through the interior treatment media 3. The exterior walls 5 are not necessarily a requirement of the treatment cell 1, as shown in FIG. 12, where the treatment media 3 is placed into a bore hole without a casing 13, with the bore hole serving as a pathway of lesser resistance to channel water to be treated 4 through the treatment media 3 without exterior walls 5 required.

As shown in FIGS. 1–5, and 9, a central conduit 9 may extend the length of the treatment cell 1, with the porous walls or porous intake and exit of the treatment container 2 allowing movement of water into, and out of, the central conduit. The void area between the walls of the interior central conduit 9, and the walls 5 of the enclosing container such as a well casing 13 having top and bottom walls 14 to enclose the treatment cell or the walls of a borehole, is filled with any conventional treatment media 3 capable of removing or destroying contaminants. Typical components of the treatment media 3 may include one or more of the following, but not limited to: bimetallics, granular metal, granular cast iron, iron foam, blast furnace slag, multiple combination or metals, granular steel, dolomite, sulfur, pyrite, phosphate rock, peat, concrete, fly ash, activated carbon, ion exchange resins, limestone, zeolites, and/or biological treatment media such as microorganisms. The permeable treatment media 3 can be placed at any point within the passively induced contaminated groundwater 4 flow. The permeable treatment media 3 can be placed within the water flow pathway in situ, or can be attached to a siphon 17 configuration above ground, at any point before the water discharge point.

Siphon Induced Flow

The installation and use of a treatment cell 1 utilizing siphons 17 as shown in FIGS. 1–9, is described in more detail in Phifer, "Preliminary Engineering Report," Westinghouse Savannah River Company report dated Jun. 10, 1997, herein incorporated by reference. The treatment media relies on treatment of groundwater contaminated with chlorinated hydrocarbons by utilizing metal catalysts to remove chlorines from the chlorinated hydrocarbon compounds. The exact pathway for the reductive dechlorination process for chlorinated hydrocarbon contaminants in groundwater has not yet been determined for granular cast iron treatment media. For discussion of the use of granular cast iron for the reductive dechlorination of chlorinated hydrocarbons, see Gillham, U.S. Pat. No. 5,266,213, herein incorporated by reference.

The treatment of the contaminated groundwater within the treatment media 3 occurs due to surface activated reactions, which may require the adsorption of the water contaminants onto specific active surface sites on the granular cast iron, bimetallics, or other metal within the treatment media 3. During the reaction the iron is oxidized, water dissociates to form hydrogen ions and gas, and the chlorine on the chlorinated hydrocarbon compounds, is replaced with hydrogen. The dechlorination process occurs within the treatment media 3, resulting in dechlorinated compounds and water flowing out the exit of the treatment media 3.

The passively induced flow treatment cell 1 systems utilizing siphons to induce passive, variable water flow through in situ, or ex situ, treatment systems requires no external power of operation. The movement of contaminated water through the treatment cells is passive and accelerated over normal groundwater movement by the placement of an upgradient water intake point having a higher water pressure head, with a water conductive pathway leading from the intake point, to a downgradient discharge point having a lower water pressure head. The water flows due to natural hydraulic head differences between the point of water intake and the point of water discharge, with passively induced, variable flow through the conduits and through the permeable treatment media placed within the water flow pathway.

Therefore very little operating and maintenance costs are associated with these systems. Operating costs associated with such systems would be primarily in the form of monitoring and change out of treatment media containers as required over numerous years of operation.

For the treatment of contaminated groundwater using the process of induced passive flow of water by siphon or pressure induced flow through a permeable treatment cell, an important element of treatment is to provide adequate contact time for the contaminated groundwater to passively flow through the defined treatment zone containing permeable treatment media. A longer residence time of the contaminated water within the treatment cell allows for maximizing of the contact time for the water passively flowing through the permeable treatment media.

Pressure Induced Flow

An example of pressure induced passive flow through a treatment cell 1 is depicted in FIGS. 10–13. A large diameter vertical well (FIGS. 10 and 11) is installed by conventional well drilling or augering techniques. Each configuration contains a flow-through, permeable treatment media 3 positioned between an upper and lower screened zone of a water collection well casing 13. Contaminated groundwater flow is passively induced through the treatment container due to the pressure head differential between the locations of the upper and lower screened zones of the well casing 13. In FIG. 12, a similar configuration is shown where a borehole without a casing is utilized to contain the treatment media 3, where the borehole serves as an outer permeable container wall. Groundwater flows into the screen with the higher head pressure, through the treatment media, and out the screened area of the container with the lower head pressure. This can be done within a single aquifer or between aquifers.

Figure 10:
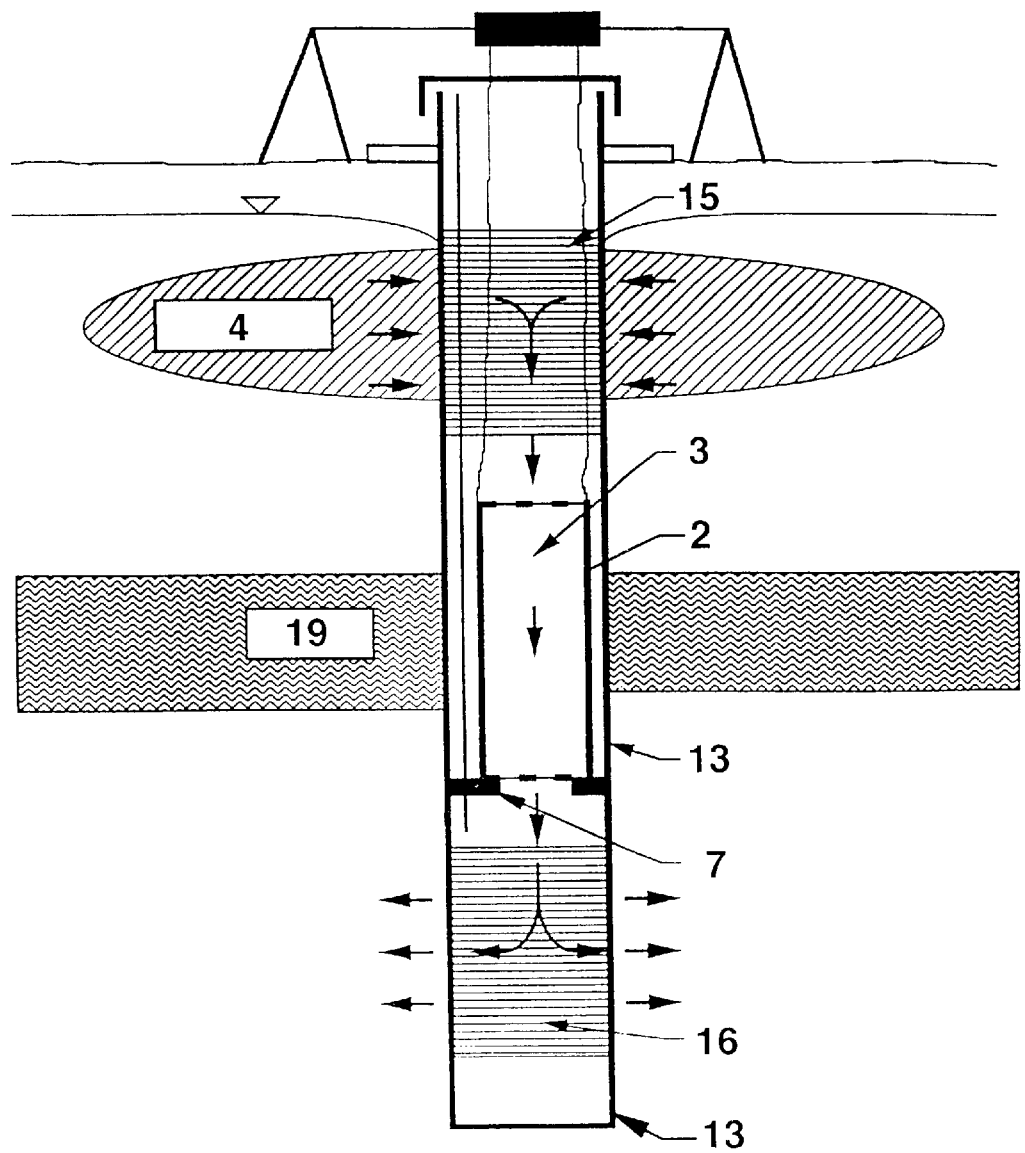

FIGS. 10–13 present an alternative treatment cell 1 configuration, as described in more detail in Phifer, "Expert Panel Report, MWMF Groundwater Southwest Plume, Geo-Flow Cell Remediation Option"(Westinghouse Savannah River Company report dated May 30, 1997), herein incorporated by reference. FIG. 10 depicts a well casing 13 containing a removable, flow-through, permeable treatment media 3 positioned between an upper 15 and lower 16 screened zone. The upper and lower screen zones could be located in the water table aquifer and lower aquifers, respectively. The treatment of the water from an aquifer would be possible to concentrations of contaminants below regulatory compliance concentration levels, without pumping of the water to the surface for treatment. Any tritium contamination in the collected water would be managed by providing a longer flow path and additional time for radioactive decay of any tritium contamination. The treatment zone can consist of one, or a plurality of containers 2 of permeable treatment media 3, installed in numerous configurations (see FIGS. 1–13). Each treatment cell of the configuration of FIGS. 10 and 11 may consist of approximately two inches or larger diameter vertical wells installed-by conventional well drilling techniques. Each well casing 13 would have an upper screened zone 15 in the contaminated water 4 aquifer and a lower screened zone 16 in the clean water aquifer below an aquitard or confining strata 19. A removable, flow-through, container 2 of permeable treatment media 3, containing granular media such as cast iron or other treatment media, would be positioned between the two screened zones. The contaminated groundwater 4 would be passively induced to flow through the treatment media 3, and may exit the well casing 13 at the lower screened zone 16. Use of a treatment cell 1 without siphons 17 is shown in FIGS. 10–13, and is described in more detail in Phifer, "Expert Panel Report, MWMF Groundwater Southwest Plume, GeoFlow Cell Remediation Option," Westinghouse Savannah River Company report dated May 30, 1997, herein incorporated by reference.

SUMMARY OF CONFIGURATIONS

As seen in FIG. 1, a variation of the present invention provides for the treatment cell to surround the water collection well, with contaminated water flowing into and through the treatment cell, with passive induced, variable flow into the collection well, and the treated water siphoned to a discharge point of lower hydraulic head pressure than the collection point.

As seen in FIG. 2, the invention allows for the treatment media and enclosing container to be placed at the discharge point for the water. The pathway for the passively induced, variable water flow is from an upgradient collection well, siphoned to the downgradient container of porous treatment media, through the treatment media, and exiting from the permeable walls of the treatment media container.

Figure 5:
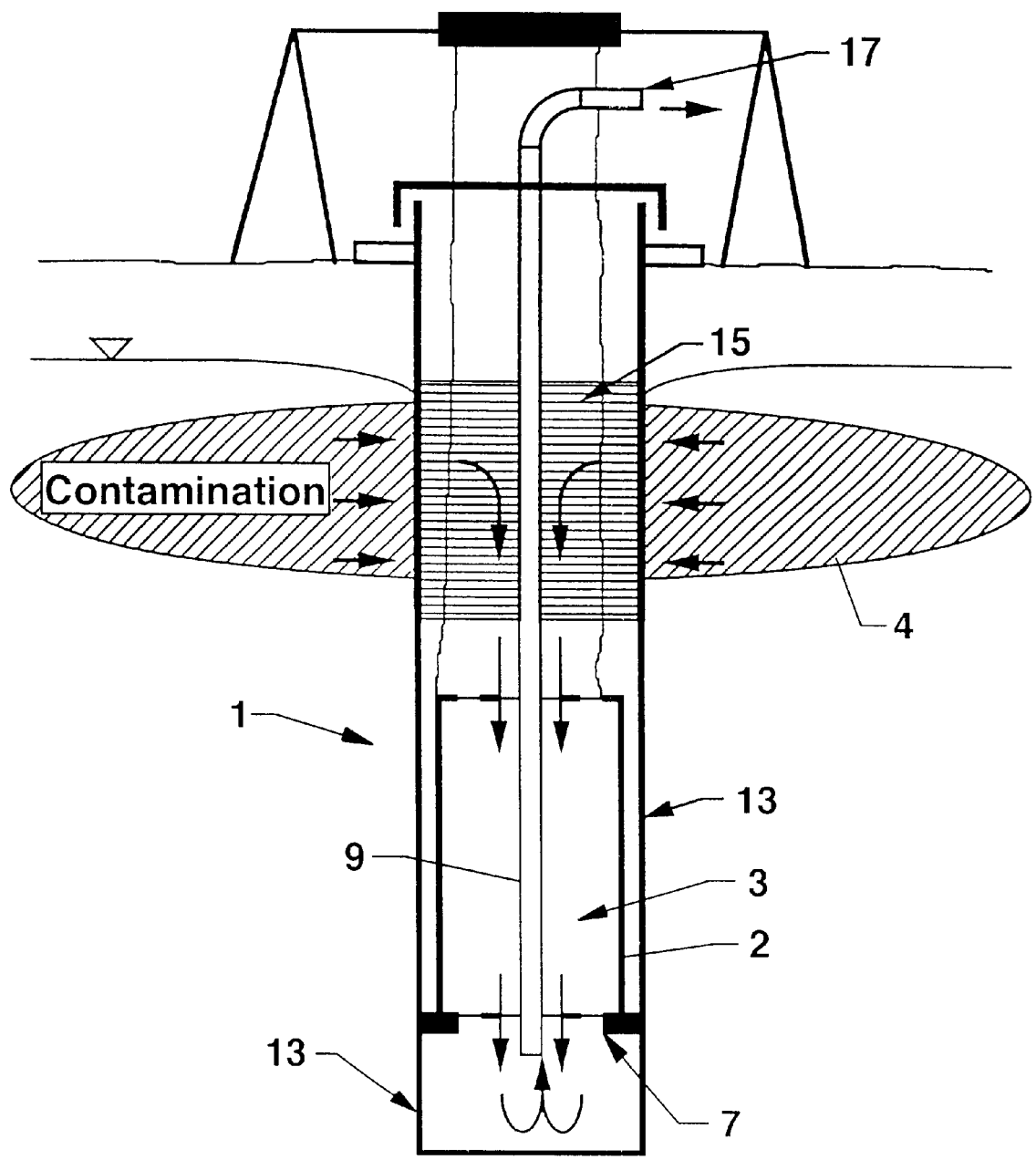
FIGS. 5–13 are cross-sectional side views which illustrate additional variations of the passively induced flow treatment cells of the present invention.

Other variations of the treatment cell, as seen in FIG. 5, place the cell inside a collection well. A removable treatment container is inserted within the water collection well. The passive flow is induced because the zone of intake for the contaminated water in the collection well is upgradient of the lower hydraulic head of the water discharge point. The contaminated water passively flows through the porous media, into the lower region of the collection well, and up through a central conduit to a siphon 17 for transfer to the discharge point.

As seen in FIG. 6, the water intake point may be located at an upgradient water collection well with a removable downgradient well containing the removable treatment container. The contaminated water passively flows from the intake point of higher hydraulic head, to and through the treatment cell inside a discharge well, and out of the central conduit of the container to a discharge zone of the discharge well that is at a lower hydraulic head.

As seen in FIG. 7, the water collection well may be placed upgradient, with passively induced flow to the aboveground, rechargeable treatment cell. The treatment cell is located at the water discharge point at a lower hydraulic head.

Figure 8:
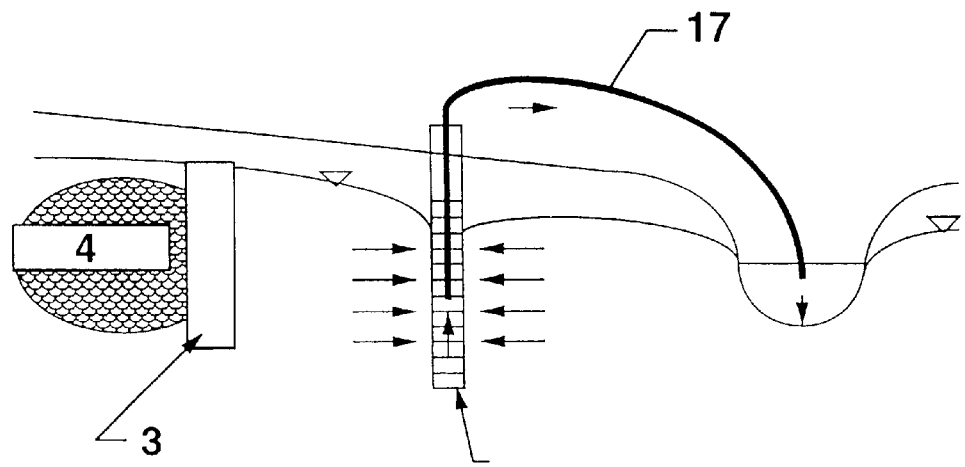

Another variation of the treatment cell, as seen in FIG. 8, locates the treatment cell in situ, and within the natural flow pathway of contaminated groundwater, with a downgradient water recovery well that has a siphon 17 moving treated water to a discharge point of lower hydraulic head.

A further variation of the treatment cell, as seen in FIG. 9, locates the treatment cell around the central casing for collection of treated water. The contaminated water is passively induced to flow laterally into and through the treatment cell, with water siphoned out of the central casing, for discharge at a point of lower hydraulic head.

An additional variation of the treatment cell, as seen in FIG. 10, is a removable treatment cell placed inside a water collection well. The treatment container is placed between the water collection zone and discharge zone of the well, with treated water passively flowing out the lower end of the well at a point of lower hydraulic head.

Figure 11:
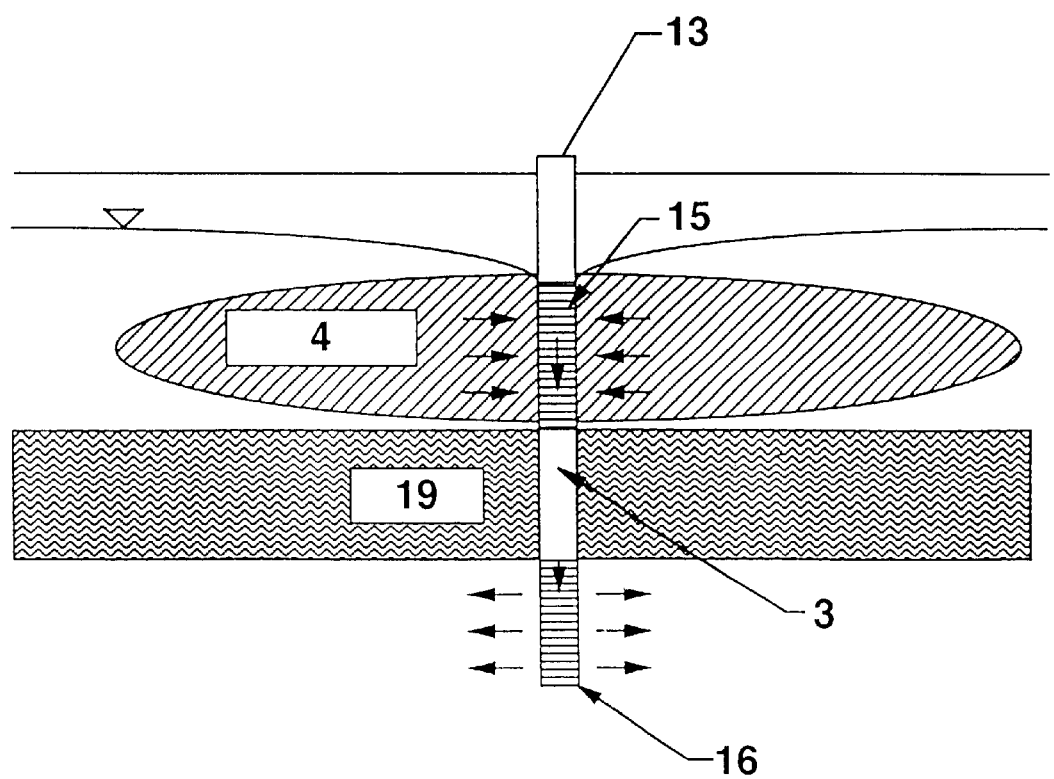

As seen in FIG. 11, the treatment media may be placed in a well between the upper screened intake zone 15, and the lower discharge zone 16. The passively induced flow is from the upper zone 15, through the permeable treatment media, and out of the lower discharge zone 16 having lower hydraulic head.

As seen in FIG. 12, the treatment media may be permanently installed treatment cell placed into a borehole, located between the upper water collection zone and the lower discharge zone. The passively induced flow of water is from the upper zone, through the permeable treatment media, and out of the discharge zone of lower hydraulic head.

Figure 13:
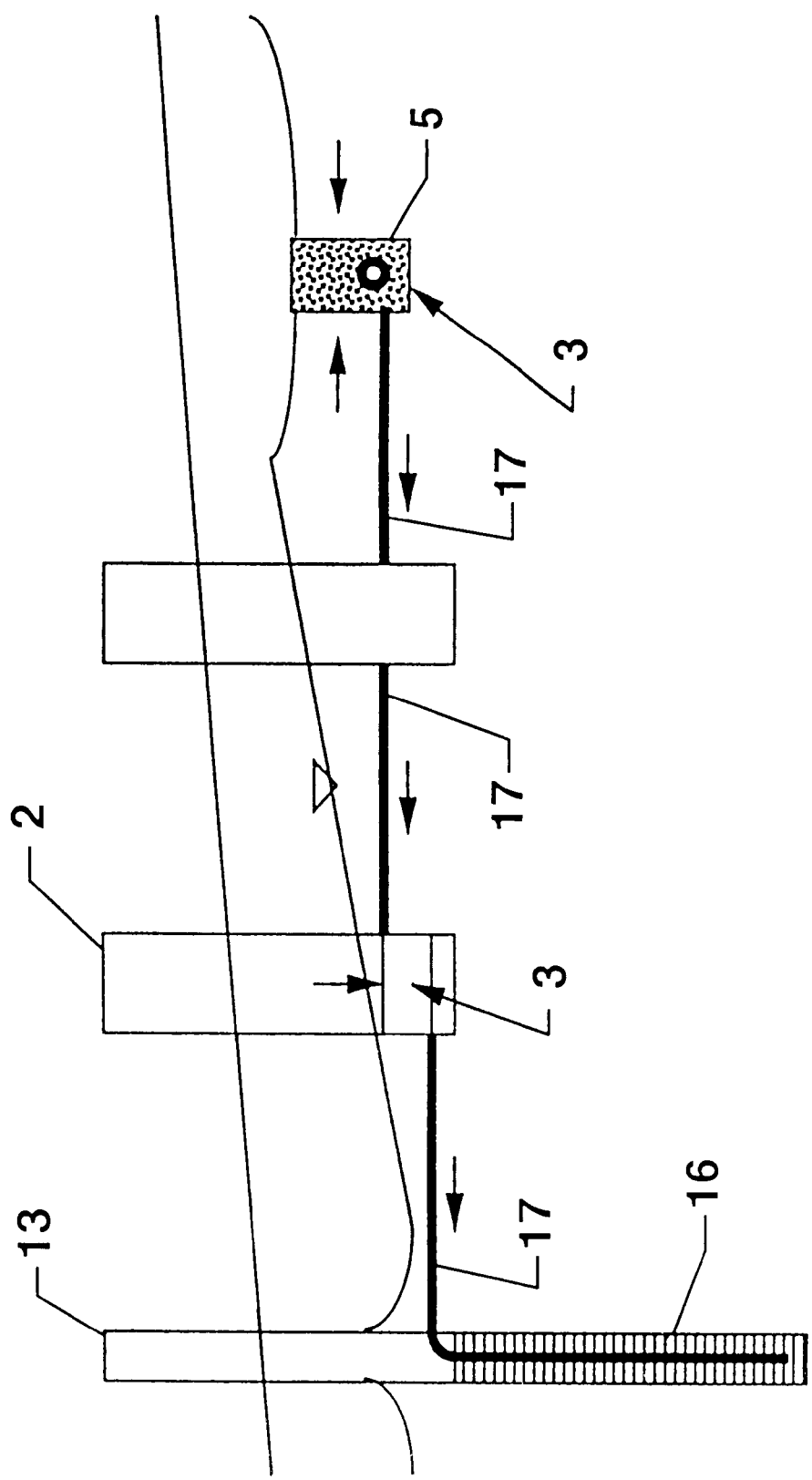

As seen in FIG. 13, the treatment media may be located in situ between the upgradient interceptor trench, and the downgradient discharge point. The passively induced flow of water is from the upper water collection trench, through the treatment media, and to the discharge trench or well of lower hydraulic head.

Although the present invention has been described in considerable detail with reference to certain preferred versions thereof, other versions are possible.

Additional configurations than those shown in FIGS. 1–13 may be assembled, with single, double, or multiple treatment containers in series or in parallel, and connected by central conduits, piping, and siphon pathways to downgradient water discharge points.

Many variations will undoubtedly become apparent to one skilled in the art upon a reading of the above specification with reference to the figures. As the foregoing description is exemplary in nature, the spirit and scope of the appended claims should not be limited to the description of the preferred versions contained herein.

What is claimed is:

1. A method for treating contaminated groundwater comprising:

selecting an intake point for groundwater, said intake point in hydraulic communication with a source of contaminated groundwater having a natural flow rate, said intake point having a first hydraulic head pressure;

selecting a discharge point for said groundwater for discharging said groundwater, said discharge point having a second hydraulic head pressure lower than said first hydraulic head pressure, wherein said intake point is located within a first aquifer and said discharge point is located at a point selected from the group consisting of a second aquifer, a vadose zone, a surface water body, and a ground surface;

providing a conduit between said intake point and said discharge point, said conduit forming a passive hydraulic communication with said intake point and said discharge point, said conduit having a relatively low hydraulic pressure head loss therethrough;

establishing a passive flow of groundwater between said intake point and said discharge point through said conduit, said passive flow having a passive flow rate greater than said natural flow rate;

providing a treatment media within said passive hydraulic communication, whereby said contaminated water flows through said treatment media prior to said discharging.

2. The process according to claim 1, wherein said conduit is selected from the group consisting of a siphon, an open channel, and a direct pressure pipe.

3. The process according to claim 1, wherein said treatment media is selected from the group consisting of granular metal, bimetallics, iron foam, blast furnace slag, activated carbon, ion exchange resin, phosphate rock, limestone, zeolites, pyrite, sulfur, fly ash, dolomite, biological treating components, and mixtures of the foregoing.

4. The process according to claim 1, wherein said treatment media is enclosed in a permeable outer enclosure.

5. The process according to claim 4, wherein said permeable outer enclosure provides a substantially even distribution of hydraulic pressure across said permeable outer enclosure.

6. The process according to claim 1, wherein said treatment media is replaceable.

7. The process according to claim 1, wherein said intake point is located within said treatment media.

8. The process according to claim 1, wherein said discharge point is located within said treatment media.

9. The process according to claim 1, wherein said intake point is selected from the group consisting of a trench, a vertical well, a horizontal well, a borehole, and a sump.

* * * * *